(12) United States Patent
Kaiwa et al.

(10) Patent No.: US 6,490,436 B1
(45) Date of Patent: Dec. 3, 2002

(54) BATTERY PACK REMOVING DEVICE

(75) Inventors: Ryoichi Kaiwa, Kanagawa (JP); Tetsuo Hirabayashi, Kanagawa (JP); Tetsuya Kubo, Kanagawa (JP); Jun Sato, Kanagawa (JP)

(73) Assignee: Matsushita Electronic Industrial Co., Ltd., Osaka (JP)

( * ) Notice: Subject to any disclaimer, the term of this patent is extended or adjusted under 35 U.S.C. 154(b) by 0 days.

(21) Appl. No.: 09/366,526

(22) Filed: Aug. 3, 1999

(30) Foreign Application Priority Data

Aug. 6, 1998 (JP) .......................... 10-233502

(51) Int. Cl.[7] ................................. H04Q 7/32
(52) U.S. Cl. .................... 455/90; 455/572; 455/575; 455/347; 379/428.01; 379/433.01; 320/107; 320/114
(58) Field of Search ................. 455/572, 573, 455/90, 575, 344, 346, 347, 348, 351, 550, 349; 379/428.01, 433.01, 433.06, 433.08, 433.12, 440; 320/107, 110, 112, 114; D13/108; 429/96, 100; 220/324, 326, 345.2, 345.3

(56) References Cited

U.S. PATENT DOCUMENTS

| 4,072,800 A | 2/1978 | Gammer | 429/96 |
| 5,637,417 A | 6/1997 | Engmark et al. | 429/96 |
| 5,697,070 A | * 12/1997 | Liebler | 320/107 |

FOREIGN PATENT DOCUMENTS

| EP | 0 836 311 | 10/1997 |
| GB | 2 224 595 | 5/1990 |
| GB | 2 315 936 | 7/1997 |
| JP | 09330687 | * 12/1997 |

* cited by examiner

Primary Examiner—William Trost
Assistant Examiner—Keith Ferguson
(74) Attorney, Agent, or Firm—Pearne & Gordon LLP

(57) ABSTRACT

A portable telephone comprises: a battery pack detachable from a portable telephone body, the battery pack including: a recess in a head section thereof; a hook formed in a bottom section thereof; and a back protrusion on the back of said head section, the portable telephone body includes: a bottom recess engageable with said hook; a slide pawl engageable with said recess in the head section of the battery pack; and a slide protrusion which is integral with the slide pawl, and which, when the slide pawl is slid, is slid and brought into contact with the back protrusion, thereby to forcibly push the head of the battery pack out of the electronic device.

13 Claims, 5 Drawing Sheets

BATTERY PACK REMOVING DEVICE

BACKGROUND OF THE INVENTION

This invention relates to battery pack removing device, and more particularly to a battery pack removing device which is used to mount a battery pack in or detach the same from a small radio terminal unit such as a portable telephone set.

FIGS. 8 and 9 show the relation between the body of a conventional portable telephone set and a conventional battery pack. More specifically, FIG. 8 is a perspective view showing a battery pack 50 mounted in a portable telephone set body 10, and FIG. 9 is also a perspective view showing only the portable telephone set body 10.

The battery pack 50 is mounted in the portable telephone set body 10 as follows: With the hooks of the battery pack 50 fitted in recesses formed in the bottom section of the portable telephone set body 10, the battery pack 50 is pushed into the portable telephone set body 10 while being swung towards the latter 10. As a result, the head section of the battery pack 50 is brought into contact with the sloped surface of the slide pawl 21 of the slide knob 20 of the telephone set body 10, thus pushing down the slide pawl 21. Hence, the slide pawl 21 of the slide knob 20 of the portable telephone set body 10 is engaged with a recess formed in the head section of the battery pack 50. Thus, the battery pack 50 has been mounted in the portable telephone set body 10. The portable telephone set body 10 has right and left side walls which are confronted with each other, and the inner surfaces thereof have protrusions 32. On the other hand, the battery pack 50 has right and left side walls on which protrusions are formed, respectively, so that they are engaged with the protrusions 32 of the side walls of the portable telephone set body 10, which prevents the play of the battery pack 50 with respect to the portable telephone set body 10.

The portable telephone set body 10 has power source spring terminals 40, and in correspondence to those terminals 40 the battery pack 50 has power source terminals. The power source terminals are brought into contact with power source spring terminals 40, so that current is allowed to flow to the portable telephone set body 10.

The battery pack 50 is detached from the portable telephone set body 10 as follows: The slide knob 20 of the portable telephone set body 10 is slid; that is, the slide pawl 21 is slid, thus disengaging from the battery pack 50. The latter 50 is moved upwardly by the elastic force of the power source spring terminals 40. Hence, by holding the protrusions 65 (which are formed on the outer surfaces of the right and left side walls of the battery pack) with the fingers, the battery pack 50 can be removed from the portable telephone set body.

In the case of Japanese Patent Application Publication No. 9-330687/(1997), 10-70595/(1998), or 10-144274/(1998), the battery pack is pushed upwardly with a push-up member or the like, so as to be removed from the portable telephone set body.

As was described above, the conventional battery pack 50 is pushed upwardly by the elastic force of the power source spring terminals 40; however, the elastic force is not strong enough. Hence, in order to remove the battery pack 50 from the telephone set body 10, it is necessary to use the protrusions 65 formed on the right and left side walls of the battery pack 50; that is, it is necessary to hold the protrusions 65 with the fingers and to pull the battery pack 50 upwardly.

Therefore, it is rather difficult to remove the battery pack 50, and during the use of the portable telephone set those protrusions obstructs the operation of the portable telephone set. In addition, the protrusions spoil the external appearance of the portable telephone set as a whole.

As was described above, the battery pack may be pushed upwardly with the push-up member or the like. However, in this case, the portable telephone set is intricate in structure, and large in the number of manufacturing steps, and accordingly high in manufacturing cost, and difficult in miniaturization.

SUMMARY OF THE INVENTION

Accordingly, an object of the invention is to eliminate the above-described difficulties accompanying a conventional portable telephone set. More specifically, an object of the invention is to provide a battery pack removing device which is simple in structure and with which the battery pack is readily and positively mounted in or detached from the portable telephone set body.

In order to solve the above-described problems, a battery pack removing device is provided which, according to the invention, has a slide protrusion which is formed on an electronic device such as a portable telephone set. The slide protrusion is integral with a slide pawl which is engageable with a recess formed in the head section of a battery pack. When the slide pawl is slid, the slide protrusion is brought into contact with the protrusion formed on the back of the battery pack, so that the head section of the battery pack is forcibly pushed out of the electronic device, whereby the battery pack can be removed from the electronic device with ease.

With the battery pack removing device, the side protrusions are eliminated which are formed on the conventional battery pack to mount the latter in the electronic device or to detach the same from the latter. That is, the battery pack removing device is simple in structure. And yet the battery pack mounting or detaching operation can be positively achieved with ease.

According to the present invention, it is provided a battery pack removing device for removing from an electronic device a battery pack which has a recess in a head section thereof, and a hook formed in a bottom section thereof, and a back protrusion on the back of the head section, and which is separable from the electronic device; in which the electronic device includes: a bottom recess engageable with the hook, a slide pawl engageable with the recess in the head section of the battery pack, and a slide protrusion which is integral with the slide pawl, and which, when the slide pawl is slid, is slid and brought into contact with the back protrusion, thereby to forcibly push the head of the battery pack out of the electronic device.

With the device, the slide protrusion of the electronic device body pushes the back protrusion of the battery pack upwardly, so that the battery pack is positively pushed upwardly.

According to the present invention, it is provided a portable telephone comprises: a battery pack detachable from a portable telephone body, the battery pack including: a recess in a head section thereof; a hook formed in a bottom section thereof; and a back protrusion on the back of said head section, the portable telephone body includes: a bottom recess engageable with said hook; a slide pawl engageable with said recess in the head section of the battery pack; and a slide protrusion which is integral with the slide pawl, and which, when the slide pawl is slid, is slid and brought into contact with the back protrusion, thereby to forcibly push the head of the battery pack out of the electronic device.

With the device, the slide protrusion of the portable telephone set body pushes the back protrusion of the battery pack upwardly, so that the battery pack is positively pushed upwardly.

DETAILED DESCRIPTION OF THE PREFERRED EMBODIMENTS

A battery back removing device, which constitutes a preferred embodiment of the invention, will be described with reference to FIGS. 1 though 7.

The embodiment of the present invention is a battery pack removing device in which a slide protrusion, which is integral with the slide pawl engageable with the head portion of the battery pack, pushes the back protrusion of the battery pack, thereby to forcibly push the head of the battery pack out of the portable telephone.

Figure 1:
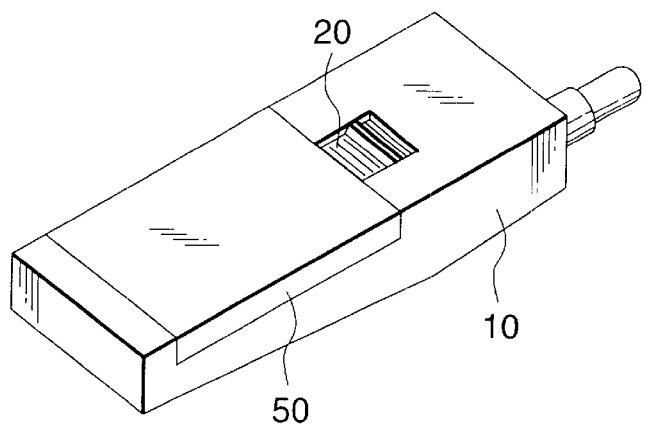
FIG. 1 is a perspective view of a portable telephone set with a battery pack removing device, which is a preferred embodiment of the invention.

FIGS. 1 to 7 show a portable telephone set having a battery pack removing device of the embodiment of the present invention, and a battery pack to be mounted thereon. FIG. 1 shows the portable telephone set to which a battery pack is integrally mounted. In FIG. 1, the portable telephone set, a battery pack 50 is detachably engaged with a portable telephone set body 10. The latter 10 has a slide knob 20 to engage the battery pack 50 with or disengage the same from the portable telephone set body 10; that is, with the slide knob 20, the battery pack 50 is mounted in or detached from the portable telephone set 10.

Figure 2:
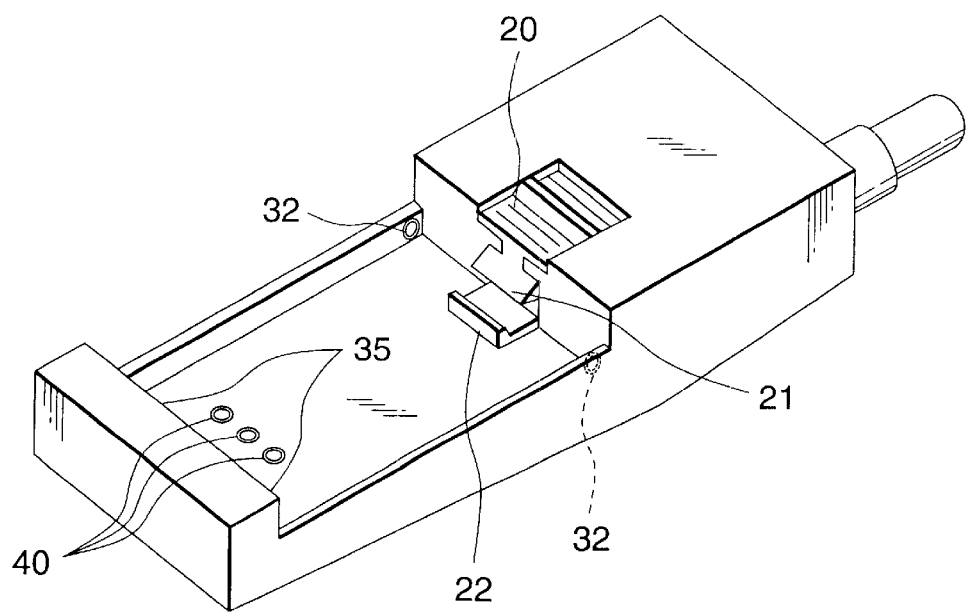
FIG. 2 is a perspective view of a portable telephone set body with the battery pack removing device of the invention.

FIG. 2 shows the portable telephone set body 10 from which the battery pack 50 has been detached. As shown in FIG. 2, the slide knob 20 has a slide pawl 21 which is means for locking the battery pack 50 to the portable telephone set body 10. The slide knob 20 operating the slide pawl 21 is provided in correspondence to the head section of the battery pack 50. The inner surfaces of right and left walls of the portable telephone set body 10 have protrusions 32 and 32 in such a manner that they correspond to protrusions 62 formed on right and left side walls of the battery pack; that is, the protrusions 32 and 32 of the portable telephone set body 10 are to prevent the play of the battery pack 50. Furthermore, the portable telephone set body 10 has power source spring terminals 40 through which current flows from the battery pack 50 to the portable telephone set body 10. The bottom section of the portable telephone set body 10 has a recess 35 (not shown in FIG. 2) which is used to fix the battery pack 50.

Figure 3:
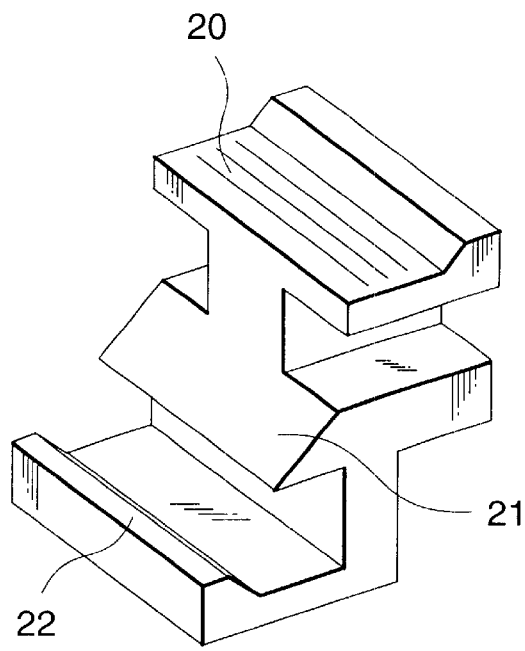
FIG. 3 is a perspective view of a slide knob of the battery pack removing device of the invention.

As shown in FIG. 3, a perspective view of the slide knob 20, the latter 20 is integral with the slide pawl 21 and a slide protrusion 22.

Figure 4:
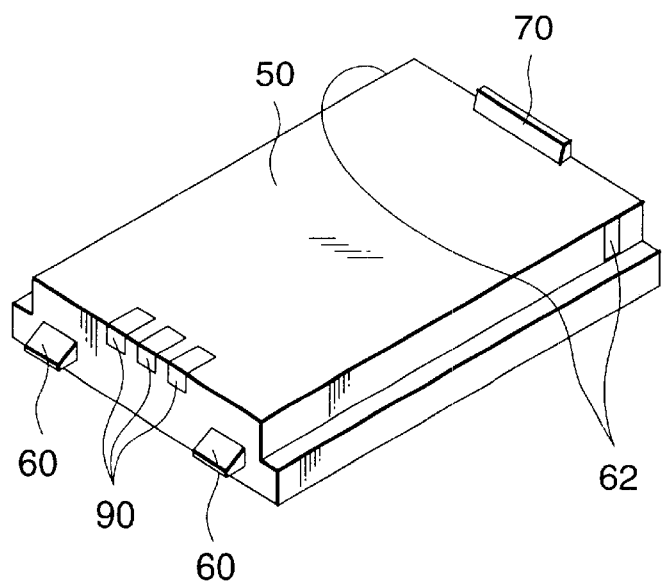
FIG. 4 is a rear view of a battery pack which is applicable to the battery pack removing device of the invention.
Figure 5:
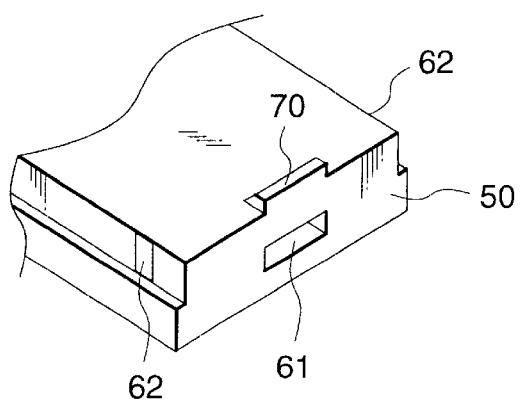
FIG. 5 is a perspective view showing part of the battery pack which is applicable to the battery pack removing device of the invention.

FIG. 4 is a perspective view showing the whole battery pack 50, and FIG. 5 is a perspective view showing the bottom section of the battery pack 50. In FIGS. 4 and 5, reference numeral 60 designates hooks 60 which is means for fixing the battery pack 50 to the portable telephone set body 10. The battery pack 50 has side protrusions 62 and 62 on its right and left side walls, which are means for preventing the play of the battery pack 50. The battery pack 50 has a recess 61 at the center of its head section. The recess 61 is engaged with the slide pawl 21 to fix the battery pack 50 to the portable telephone set body 10. The battery pack 50 has power source terminals 90 through which current is supplied to the portable telephone set body 10.

Figure 6:
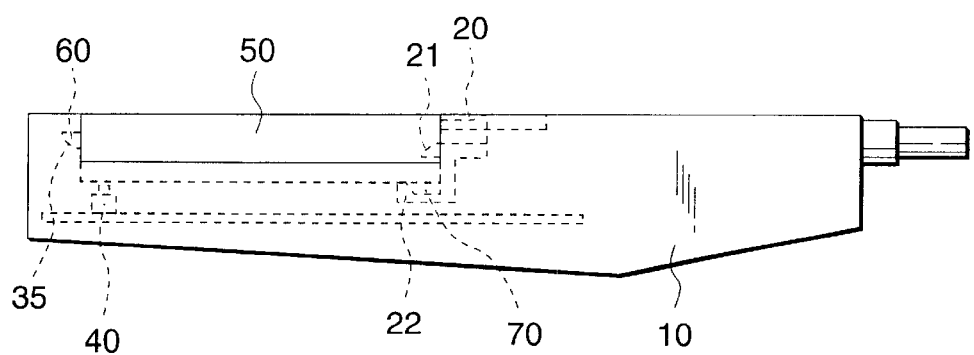
FIG. 6 is a side view of the portable telephone set body with the battery pack removing device of the invention.
Figure 7:
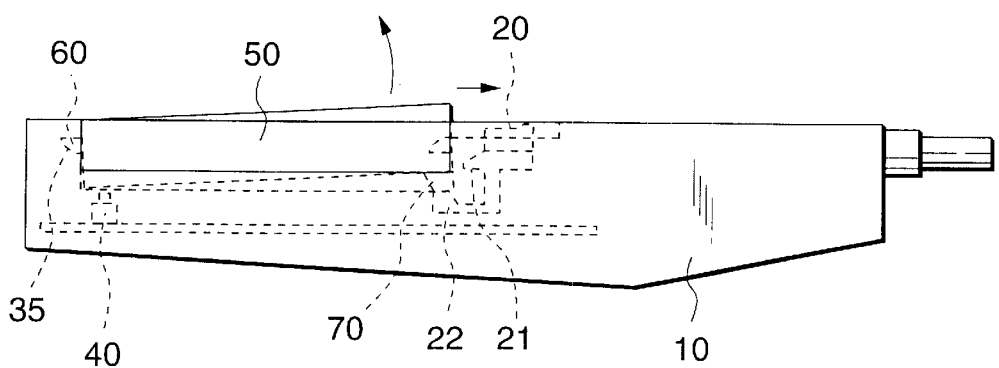
FIG. 7 is a side view for a description of the removal of the battery pack from the portable telephone set body with the battery pack removing device of the invention.
Figure 8:
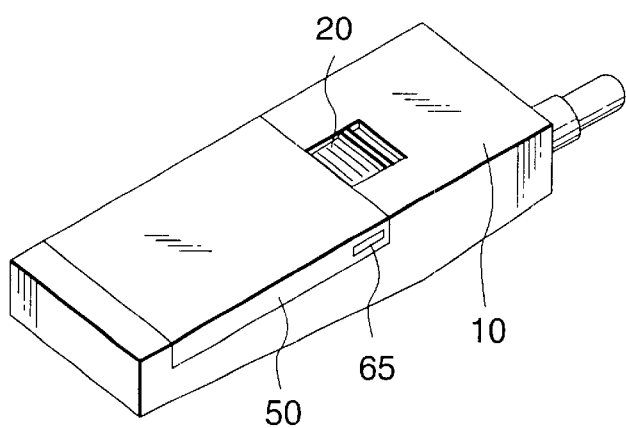
FIG. 8 is a perspective view showing a conventional portable telephone set.
Figure 9:
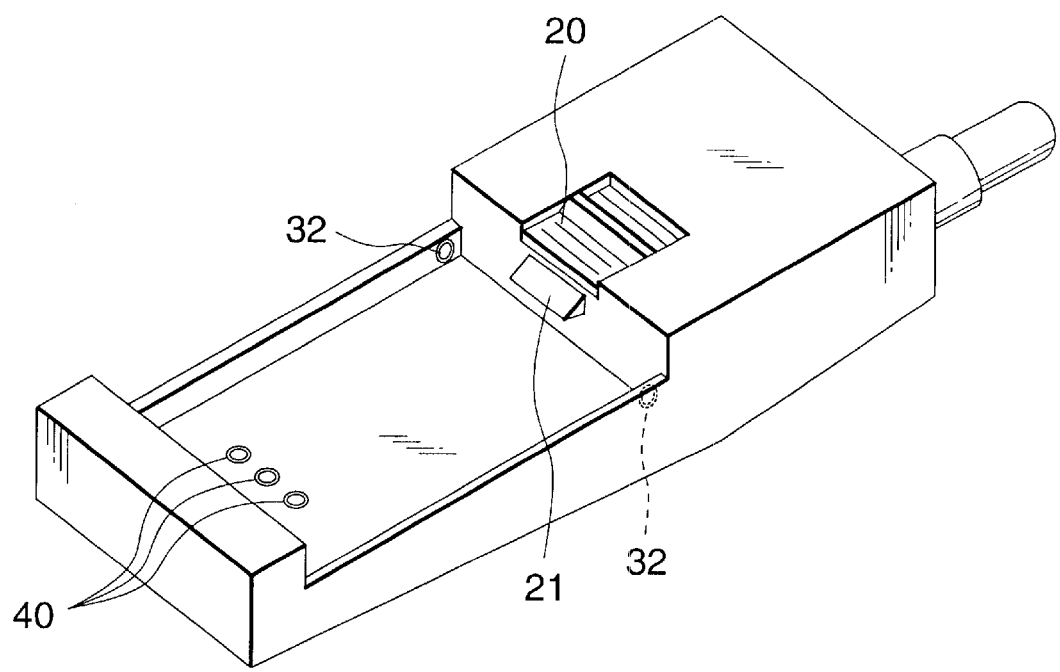
FIG. 9 is a perspective view showing a conventional portable telephone set body.

As was described before, FIG. 6 is a side view of the portable telephone set body in which the battery pack has been mounted, and FIG. 7 is a side view for a description of the removal of the battery pack from the portable telephone set body.

The battery pack removing device thus designed will be described with reference to FIGS. 1 through 7 in more detail.

The battery pack 50 is mounted in the portable telephone set body 10 as follows: First, the hooks 60 of the battery pack 50 are engaged with the recesses 35 formed in the bottom section of the portable telephone set body 10. Under this condition, with the head section of the battery pack 50 held with the finger, the battery pack 50 is swung so that it is set in the portable telephone set body 10. In this operation, the slide pawl 21 is temporarily pushed in by the battery pack 50. When the battery pack 50 is moved to a predetermined position, the slide pawl 21 is returned and fixedly engaged with the recess 61 of the battery pack 50.

The play of the battery pack 50 with respect to the portable telephone set body 10 is prevented by the abutment of the protrusions 62 of the battery pack 50 with the protrusions 32 of the portable telephone set body 10. Current is supplied from the battery pack to the portable telephone set body 10 through the power source spring terminals 40 and the power source terminals 90.

The battery pack 50 is detached from the portable telephone set body 10 as follows:

In this case, the portable telephone set is as shown in FIG. 6. Under this condition, the slide knob 20 of the portable telephone set body 10 is slid in the direction of the arrow in FIG. 7. In this slide operation, the slide pawl 21 (which is a part of the slide knob 20), is slid in the same direction, thus being disengaged from the recess 61 of the battery pack 50. At the same time, the slide protrusion 22 is brought into contact with a protrusion 70 (which is formed on the back of the head section of the battery pack 50), so that the latter 70 is pushed upwardly; that is, the battery pack 50 is positively pushed upwardly. Hence, the battery pack 50 can be readily detached from the portable telephone set body 10.

As is apparent from the above description, in the battery pack removing device, the embodiment of the invention, the slide protrusion integral with the slide pawl (which is adapted to lock the head section of the battery pack) pushes upwardly the protrusion formed on the back of the battery pack, so that the head section of the battery pack is forcibly pushed out of the portable telephone set body. Hence, the battery pack can be positively and readily removed from the portable telephone set body.

As is apparent from the above discussion and the drawing Figures, the back protrusion 70 extends away from the back of the battery pack 50. Also, the back protrusion 70 has a sloped surface that extends at an angle from the back of the battery pack 50.

The slide knob 20, with its integral slide pawl 21 and slide protrusion 22, moves as a single part along a linear direction during sliding movement. In addition, the slide protrusion 22 has a sloped surface that extends at an angle relative to the direction of sliding movement of the slide knob 20.

The sloped surfaces of the slide protrusion 22 and the back protrusion 70 slide against each other during sliding movement of the slide knob 20 to push the battery pack 50 in a direction generally perpendicular to the direction of sliding movement of the slide knob 20. As such, the slide protrusion 22 and the back protrusion 70 are configured to provide a wedge force to push the battery pack 50 during the sliding movement.

As was described above, according to the invention, the electronic device such as a portable telephone set has the slide protrusion according to the invention. The slide protrusion is integral with the slide pawl which is engageable with the recess formed in the head section of the battery pack. As the slide pawl is slid, the slide protrusion is brought into contact with the protrusion formed on the back of the battery pack, so that the head section of the battery pack is forcibly pushed out of the electronic device. Hence, merely by pulling the slide knob with the fingers, the battery pack is moved upwardly, so that it can be detached from the electronic device with ease. Accordingly, with the battery pack removing device of the invention, it is unnecessary to increase the number of components. And, the device is simple in structure and high in operability.

Furthermore, no protrusion for removal of the battery pack is provided on the right and left side walls of the battery pack, which improves the external appearance of the battery pack and accordingly the design of the same.

What is claimed is:

1. A battery pack removing device for removing from an electronic device a battery pack, in which:
    said battery pack which is detachable from said electronic device, includes:
        a recess in a head section thereof;
        a hook formed in a bottom section thereof; and
        a back protrusion on the back of said head section,
    said electronic device includes:
        a bottom recess engageable with said hook;
        a slide pawl engageable with said recess in said head section of said battery pack; and
        a slide protrusion which is integral with said slide pawl, and which, when said slide pawl is slid, is slid and brought into contact with said back protrusion, thereby to forcibly push said head of said battery pack out of said electronic device.

2. A battery pack removing device as claimed in claim 1, wherein said electronic device is a portable telephone.

3. A battery pack as claimed in claim 1, wherein said slide protrusion and slide pawl move together along a linear direction during sliding movement of said slide protrusion and slide pawl.

4. A battery pack as claimed in claim 1, wherein said back protrusion extends away from said back.

5. A battery pack as claimed in claim 1, wherein said back protrusion has a sloped surface that extends at an angle from said back, said slide protrusion has a sloped surface that extends at an angle relative to a direction of sliding movement of said slide protrusion and slide pawl and that slides against said sloped surface of said back protrusion during sliding movement of said slide protrusion and slide pawl, and wherein the sliding of said sloped surface of said slide projection on said sloped surface of said back projection pushes said head of said battery pack in a direction generally perpendicular to the direction of sliding movement of said slide protrusion and slide pawl.

6. A battery pack as claimed in claim 1, wherein said slide protrusion and said back protrusion are configured to provide a wedge force to push said head of said battery pack during sliding movement of said slide protrusion and slide pawl.

7. A battery pack as claimed in claim 1, wherein said slide protrusion and slide pawl are formed as a single part.

8. A portable telephone comprising:
    a battery pack detachable from a portable telephone body, said battery pack including:
        a recess in a head section thereof;
        a hook formed in a bottom section thereof; and
        a back protrusion on the back of said head section,
    said portable telephone body includes:
        a bottom recess engageable with said hook;
        a slide pawl engageable with said recess in said head section of said battery pack; and
        a slide protrusion which is integral with said slide pawl, and which, when said slide pawl is slid, is slid and brought into contact with said back protrusion, thereby to forcibly push said head of said battery pack out of said electronic device.

9. A portable telephone as claimed in claim 8, wherein said slide protrusion and slide pawl move together along a linear direction during sliding movement of said slide protrusion and slide pawl.

10. A portable telephone as claimed in claim 8, wherein said back protrusion extends away from said back.

11. A portable telephone as claimed in claim 8, wherein said back protrusion has a sloped surface that extends at an angle from said back, said slide protrusion has a sloped surface that extends at an angle relative to a direction of sliding movement of said slide protrusion and slide pawl and that slides against said sloped surface of said back protrusion during sliding movement of said slide protrusion and slide pawl, and wherein the sliding of said sloped surface of said slide projection on said sloped surface of said back projection pushes said head of said battery pack in a direction generally perpendicular to the direction of sliding movement of said slide protrusion and slide pawl.

12. A portable telephone as claimed in claim 8, wherein said slide and back protrusions are configured to provide a wedge force to push said head of said battery pack during sliding movement of said slide protrusion and slide pawl.

13. A portable telephone as claimed in claim 8, wherein said slide protrusion and slide pawl are formed as a single part.

* * * * *